Figure 1:
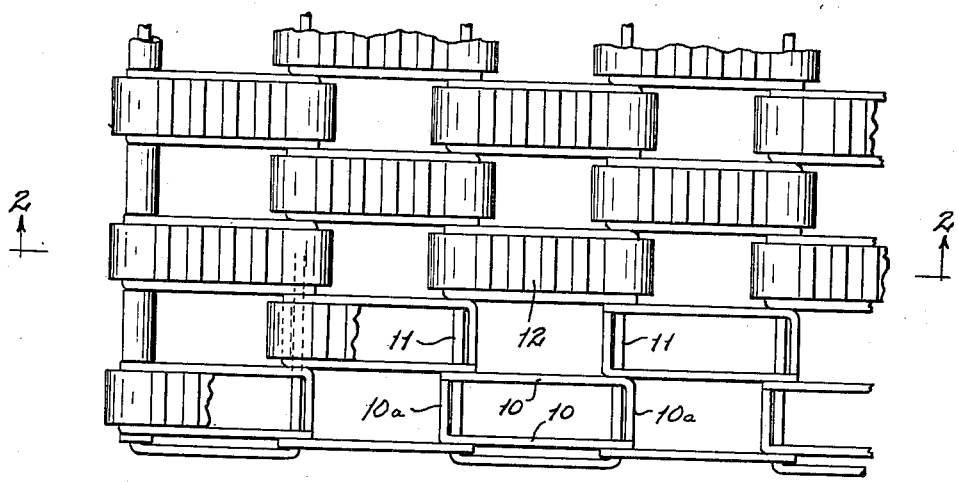

July 1, 1941.　　A. C. THOMAS ET AL　　2,247,530
LINK MAT STRUCTURE AND PARTS THEREOF
Filed June 8, 1939　　2 Sheets-Sheet 1

INVENTORS
ALBERT C. THOMAS and
BY　ALFRED V. McFERRON
Bates, Golrick & Teare
ATTORNEYS Patented July 1, 1941

2,247,530

UNITED STATES PATENT OFFICE 2,247,530

LINK MAT STRUCTURE AND PARTS THEREOF

Albert C. Thomas and Alfred V. McFerron, Cleveland, Ohio

Application June 8, 1939, Serial No. 278,872

5 Claims. (Cl. 20—78)

This invention is concerned with improvements in floor mats, and particularly floor mats of the link type wherein the tread or walking surfaces are resilient.

Floor mats of the link type have been used heretofore by constructing or forming the links of laminations of leather, fiber or rubberized fabric. More recent commercial developments of such types of floor mats comprise a rollable mat construction formed of rubber links pivotally connected by cross wires or pivot rods extending through pivot holes formed in the links, and it is with this last-mentioned type of mat construction to which the present invention pertains.

Link mats wherein the links are formed of compounded rubber have had various advantages over prior link mat constructions in that the tread surface of the mat does not become slippery during inclement weather and various combinations of color effects and designs can be obtained when the mat links and pivot rods are being assembled. However, certain disadvantages incident to the use of rubber link mats have now become apparent, such as the rapid wear of links comprising only a small portion of the mat area, irregular distortion and elongation of the mat, due to elongation of certain of the worn links in the mat after the mat has been in use for a period of time and the uneconomical waste of a major portion of the mat structure which has not been subjected to wear, due to the fact that it is more economical to discard the complete mat than to attempt to replace the worn links.

Wherefore, the general object of the present invention is to provide a mat construction which will have all of the advantages of a rubber link mat construction and by reason of its construction the disadvantageous characteristics of such rubber link mat constructions are eliminated.

Another object of the present invention is the provision of a link mat wherein a metallic skeleton frame of links comprises a permanent assembly of the mat construction, and wherein each link unit is adapted to retain a resilient removable tread plug which can be readily replaced without necessitating the complete disruption of the mat assembly.

A further object of the invention is the provision of a novel tread block formation for a resilient link mat.

A further object of the present invention is the provision of a roll-up link mat construction which can be manufactured in an economical manner, while at the same time fulfilling the foregoing stated objects.

Other objects of the present invention will become apparent from the following description of the accompanying drawings which illustrate a preferred form of the mat construction and some modifications thereof.

Figure 2:
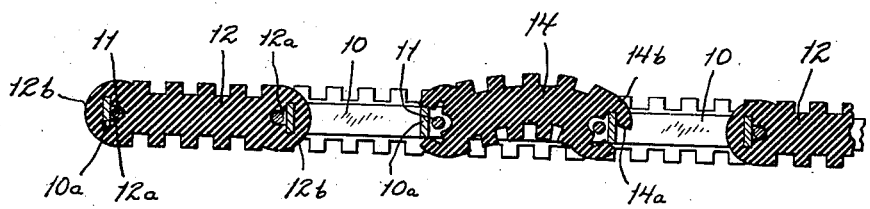
Figures 3, 4:
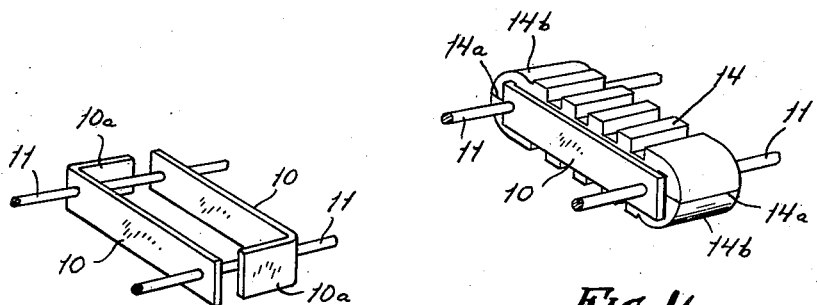
Figure 5:
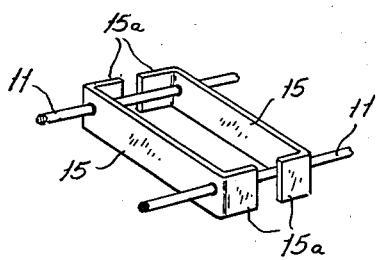
Figure 6:
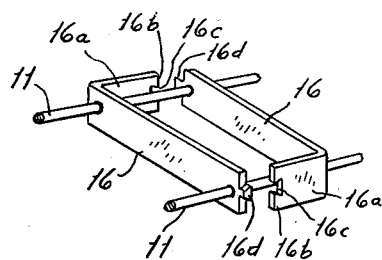
Figure 7:
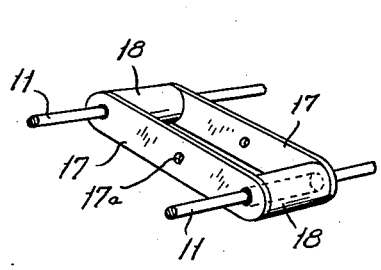
Figure 8:
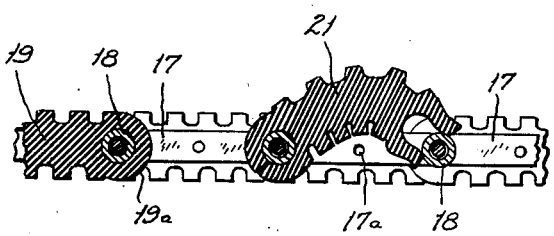

In the drawings, Fig. 1 is a plan view of a part of our mat construction, part of which illustrates the permanent assembly characteristics of the mat, when certain of the tread blocks are removed therefrom; Fig. 2 is a cross-sectional elevation, taken substantially along the line 2—2 of Fig. 1, and illustrating the manner of removing and/or replacing a worn or distorted tread block of the mat structure; Fig. 3 is a perspective fragmentary view, showing the manner of assembly of the elements comprising the metallic links forming the permanent frame of the mat structure; Fig. 4 is a perspective view of a link assembly, and illustrating a link unit when a tread block of the mat assembly has been replaced; Figs. 5, 6 and 7 are perspective views of modifications of the metallic elements forming the permanent assembly of the mat structure; and Fig. 8 illustrates a modified form or shape of the resilient tread blocks and the manner of renewing or replacing the same.

Rubber link mats as at present manufactured and used comprise a series of elongated rubber link members having suitable non-skid tread surfaces formed on opposite sides, whereby the mat can be reversed upon the floor to meet wear and deterioration conditions, and the rubber members of the assembly per se comprise the links of the mat, such rubber links being provided with transverse openings formed therein through which the pivot bars extend. The links usually are assembled in rows in staggered relation to adjacent links, whereby the ends of the links overlap longitudinally of the link structure. Such mat constructions usually have rubber link factors which involve a compromise between the most desirable rubber compound formula for the links insofar as resiliency and wearing characteristics are concerned and the tensile strength of the compound when cured to obtain a sufficiently strong link that will retain its shape when being used upon the floor or when being stored in a rolled-up condition. With such a compromise the serviceable characteristics of the rubber links of the mat structure are not retained particularly after certain of the links have become considerably worn, for undue stretching and warping of certain parts of the tread surface of the mat takes place. By reason of the non-replaceability of individual links without a high renovation expense the entire mat is discarded.

In our present structure we have formed the body of the mat entirely of metallic members of such shape that these metallic members may be readily assembled in cooperative relation with replaceable resilient tread blocks, preferably formed from slabs of extruded rubber compound properly cured, and which in all respects resemble and function the same as the links of a rubber link mat, but which do not perform the function of the links in a rubber link mat structure.

Referring to Fig. 1, the mat assembly may comprise complementary formed L-shaped metallic members 10, provided with perforations adjacent the longitudinal ends thereof with one perforation located inside of and immediately adjacent transversely extending end portions 10a thereof and through which extend pivot bars or rods 11 of the mat assembly. The inside length of the legs 10a is equal substantially to the width of replaceable resilient tread plugs or blocks 12, preferably formed of a properly compounded rubber. However, these blocks may be formed of any serviceable resilient material. It will be noted, as shown in Figs. 1 and 3, that the L-shaped link members 10 are so dimensioned that when assembled upon the pivot rods 11, the ends of the leg portions 10a thereof will laterally abut the ends of the link portions of the link members 10, whereby the lateral spacing between the two complementary link members 10 comprising a link unit, is definitely defined, and this space is equal substantially to the width of the removable tread blocks 12.

One of the salient features of the present invention is to form the ends of the blocks 12, whereby a certain gripping strength may be obtained for a purpose to be described. Transverse perforations are formed in the end portions of the tread blocks 12 in such manner that the leg portions 10a of the link members 10, together with the link rods 11, may extend therethrough. One form of such a tread block structure is shown in cross-section in Fig. 2, where it will be noted that a transverse opening 12a is so shaped that the transversely extending leg portions 10a of the metallic link members and the pivot rods 11 may be readily inserted therethrough when the respective elements of the mat structure are being assembled. It will be apparent that the order of assembly may be varied, but a convenient sequence of steps of assembly would comprise the insertion of the leg portions 10a of the link members 10 into the transverse openings of the tread blocks 12, before the metallic link members are assembled upon the pivot bars 11.

As shown, the ends 12b of the tread blocks are rounded, but are of sufficient cross-sectional bulk to preserve the rubber link appearance of the mat assembly, and also to provide a sufficient elastic or tensile strength in the tread block ends when the tread bolck is replaced to firmly grip the transverse portions 10a of the link members 10. When it is desired to replace one of the tread blocks 12, or a series of the tread blocks when worn, the same can be accomplished in the following manner: The ends 12b of the tread blocks are cut or slit with a knife, whereupon the tread blocks may be quickly removed from engagement with the leg portions 10a of the metallic link members 10 and from the pivot rods 11, thereby exposing the pivot joints of the metallic link unit. A new tread block 14 having the end portions 14b thereof provided with transverse slits 14a, as shown in Fig. 4, can then be placed in position, as shown in Fig. 2, by stretching the split ends thereof and by longitudinally buckling the blocks thereby to place the same in the mat assembly. The resilient material forming the new blocks 14 should be such that the ends will have sufficient tensile strength to snap into the assembled position, shown in Fig. 4, with the slit faces of the ends in contact to prevent the ingress of foreign matter and to cause the end portions of the blocks to engage the leg portions 10a of the link members. By forming the link members 10 of flat metallic strips of sufficient width to afford a durable, permanent metallic mat frame but with a width which is less than the height of thickness of the tread blocks 12, the metallic members of the frame will always be disposed below the tread surface of the mat. The tread block sides are engaged by the inner surfaces of the link members 10 in more or less of a friction-retaining relation, thereby serving to assist in holding the inserted blocks 14 in place in the mat assembly. The shape of the leg portions 10a of the link members is such as to have a further retaining influence upon the slit inserted blocks, thus preventing the blocks from being dislodged when the mat is in use upon the floor and when the mat is in a rolled-up condition when placed in storage.

In Fig. 5 of the drawings, we show in perspective the metallic link unit slightly modified, when compared to the link unit illustrated in Fig. 3, in that the metallic link members 15 are provided with transversely extending leg portions 15a at both ends thereof, which leg portions have an inside length substantially equal to one-half the width of the tread blocks 12. The function, preferred order of assembly, etc., of the arrangement shown in Fig. 5 is the same as hereinbefore described with reference to the metallic link units shown in Fig. 3.

In Fig. 6 we illustrate another modification of the metallic link unit shown in Fig. 3, in that the legs of the transversely extending leg portions 16a have formed on the abutting ends 16b thereof, a slot 16c, which is wider at the bottom than at the top, and which engages a complementarily formed lug 16d on the link end of the member 16. If desired, such a connection may be welded, peened, soldered or otherwise permanently joined. The function of this arrangement of the mat assembly is the same as hereinbefore described, with reference to the metallic link unit, disclosed in Fig. 3.

In Fig. 7 we show a further modification of the metallic link unit, in that metal link plates 17 are maintained in spaced-apart relation by tubular metallic members 18 having a length corresponding substantially to the width of the tread blocks 12. The tubular members 18 may loosely abut the link plates 17 or they may be welded or otherwise secured to the links 17. If desired, the order of assembly, relative to the tread blocks, may be as illustrated, for example, in Fig. 8, wherein a modification of the tread block 12 is shown in that the transverse openings in the blocks 19 are round to fit the tubular spacing members 18. The tread blocks 19 have rounded ends 19a which may be cut with a knife or other appropriate tool to permit removal from the mat structure. A replacing block 21 slitted and buckled as shown in Fig. 8 is then inserted in the place of the discarded tread block.

If desired, any or all of the metallic link members may be provided with perforations, such as the perforations 17a, shown in Fig. 7, whereby a brad or tack may be passed therethrough into the resilient tread blocks to thereby assure further the retention of the renewed or inserted tread blocks in proper position. Also, if desired, all of the original tread blocks may have the ends thereof slit at the time the mat is assembled, although we prefer to have the original mat assembly made up with tread blocks which do not have the ends slit.

From the foregoing description of our invention it will be seen that the objects thereof may be obtained by various alterations in the construction of the metallic link members or elements forming a metallic link unit, and the order of assembly of the elements comprising the metallic link units may be varied, if desired. For example, only certain of the tread blocks, when originally assembled in the mat structure, may be slit, while others are not slit or the metallic link units may be assembled completely upon the pivot rods to form a metallic mat frame, after which all of the original tread blocks (if slit) may then be brought into assembled relation with the respective metallic link units. However, we have found it more convenient and economical in manufacture to have tread blocks with unsplit ends assembled with the link elements comprising each metallic link unit before placing the unit upon the pivot rods. In any case the tread blocks can be readily removed and replaced by new tread blocks in the manner hereinbefore described.

Also, it will be seen that our mat structure has particular advantages over any mat structures heretofore known to us, where the mat is of considerable area, such as is required in apartment houses, churches, office structures and other structures and where the foot traffic thereover is constant and where only certain portions of the mat surface are subjected to wear, for the entire mat need not be discarded, but merely renovated as described. And further, by reason of the fact that the entire link function of the mat structure is fulfilled by metallic members comprising a permanently assembled mat frame, the structure is such that no loads or stresses can accumulate upon any particular clusters of the soft tread blocks, the tread blocks only being subjected to the usual local stubbing and compression wear action by foot traffic. Tearing or cracking of the blocks, due to pivot bar or rod tearing, is eliminated entirely. No specific reference as to the anchoring of the ends of the pivot rods has been made herein for this part of the mat structure forms no part of the present invention.

We claim:

1. A foldable link mat structure, comprising a mat frame formed of rigid link members having transversely extending abutting portions, resilient tread members embracing the abutting portions of the link members and pivot rods extending through the link members and the tread members.

2. In a mat structure of the resilient roll-up type, a metallic mat frame formed of longitudinally extending link members, pivot bars connecting the link members, means on the pivot bars between the links for maintaining the link members in a substantially uniformly spaced dimension and tread blocks disposed between pairs of the link members and embracing the means on the pivot bars while being individually or entirely removable and replaceable without necessitating the disorganization of the mat frame assembly.

3. In a mat structure of the resilient roll-up type, a metallic mat frame formed of longitudinally extending link members arranged in pairs and provided with transversely extending abutting portions, to maintain the link members in a substantially uniformly spaced dimension, pivot bars connecting the link members and replaceable tread blocks disposed between pairs of the link members and embracing the pivot bars and the transversely extending portions of the link members while being individually or entirely removable and replaceable without necessitating the disorganization of the mat frame assembly.

4. In a mat structure of the resilient, roll-up type, a permanently assembled metallic mat frame formed of longitudinally extending link members, pivot bars connecting the link members adjacent the ends thereof, spacer means between said link members for maintaining the link members in a substantially uniformly spaced dimension and tread blocks disposed between pairs of the link members and embracing said spacer means while being individually or entirely removable and replaceable without necessitating the disorganization of the mat frame assembly.

5. A tread member for a mat structure of the foldable type comprising a resilient plug elongated in shape and having end portions provided with transversely extending pivot bar and link bar receiving apertures, said tread member being provided with slits extending transversely across the ends thereof and communicating with said apertures whereby said member can be placed in the mat structure without disorganizing the mat structure assembly, said slits being removed from the plane of wear of either side of the plug.

ALBERT C. THOMAS.
ALFRED V. McFERRON.